United States Patent [19]

Spenadel et al.

[11] 4,244,861

[45] Jan. 13, 1981

[54] INJECTION MOLDING THERMOSET INTERPOLYMERS OF ETHYLENE-PROPYLENE AND PRODUCT THEREOF

[75] Inventors: Lawrence Spenadel, Westfield; Ilan Duvdevani, Leonia; Edward N. Kresge, Watchung, all of N.J.

[73] Assignee: Exxon Research & Engineering Co., Florham Park, N.J.

[21] Appl. No.: 14,427

[22] Filed: Feb. 23, 1979

Related U.S. Application Data

[63] Continuation-in-part of Ser. No. 864,340, Dec. 27, 1977, abandoned.

[51] Int. Cl.$^3$ ............................................. C08L 23/16
[52] U.S. Cl. .................................. 260/42.33; 252/511; 260/42.42; 264/328.2; 264/331; 525/242; 525/263; 525/281; 525/284; 525/305; 525/313
[58] Field of Search .................. 264/328, 329, 331; 252/511; 260/42.33, 42.42; 525/242, 263, 281, 284, 305, 313

[56] References Cited

U.S. PATENT DOCUMENTS

| | | | |
|---|---|---|---|
| 3,198,868 | 8/1965 | Pedretti et al. | 264/347 |
| 3,256,366 | 6/1966 | Corbelli | 260/897 A |
| 3,806,558 | 4/1974 | Fischer | 260/42.33 |
| 3,904,470 | 9/1975 | Fukuki et al. | 260/42.33 |
| 3,915,928 | 10/1975 | Leibu | 260/42.18 |
| 3,957,919 | 5/1976 | Von Bodungen et al. | 260/42.33 |

*Primary Examiner*—Jeffery R. Thurlow
*Attorney, Agent, or Firm*—John J. Mahon; Harvey L. Cohen

[57] ABSTRACT

An injection-moldable, peroxide crosslinkable elastomeric composition comprises a mixture of a crystalline interpolymer comprising ethylene and propylene; a low density polyethylene; one or more multifunctional vinylic or allylic monomers; a medium to high structure form of carbon; and an organic peroxide.

The composition is particularly useful for the fabrication of injection molded structures which are required to flex on impact and return to their original shape when the distorting force is released. Typical structures are automotive fender extensions, grilles and front and rear fascia.

14 Claims, No Drawings

INJECTION MOLDING THERMOSET INTERPOLYMERS OF ETHYLENE-PROPYLENE AND PRODUCT THEREOF

CROSS-REFERENCE TO RELATED APPLICATIONS

This application is a continuation-in-part of application Ser. No. 864,340 filed Dec. 27, 1977 now abandoned.

BACKGROUND OF THE INVENTION

1. Field of the Invention

This invention relates to a thermosetting elastomeric composition and a process for its production. More particularly, this invention is concerned with an injection-moldable elastomeric composition comprising a mixture of a crystalline interpolymer comprising ethylene and propylene; a low density polyethylene; one or more multifunctional vinylic or allylic monomers which copolymerizes in the presence of peroxide and which functions as a co-curing agent, an amount of carbon sufficient to render the composition, when crosslinked, electrostatically conductive; and a peroxide crosslinking agent. Most particularly, this invention relates to the said composition, a method for its production and to cross-linked structures made from the composition which are fully cured and thermoset.

Recently the need for improved fuel economy in the operation of automobiles has led to smaller cars and automotive manufacturers lowering the weight of automobiles by replacing steel, particularly in the body, with light metal alloys and polymeric compositions. Currently automotive companies are developing elastomeric structures (fascia) for the front and rear ends of automobiles to replace the present steel fender extensions, radiator grilles and the like. These structures are required to flex on impact in concert with energy absorbing devices and return, undamaged, to their original shape when the distorting forces are released. In addition, the structure must readily accept paint and the finished surface must have adequate weather resistance and show a minimum of marking or marring on impact and recovery.

Suitable and commercially acceptable compositions for the fabrication of these structures must not only be capable of being amenable to mass production methods, as by conventional injection molding techniques, but the finished product must possess the necessary physical properties of high flexural stiffness, high tensile strength, hardness, ability to recover rapidly to its original state when deformed and to be mar and tear resistant. In addition, since fascia structures are usually painted electrostatically and the paint cured in an oven, the structure must be electrically conductive and must not undergo deformation when passing through the paint oven.

2. Prior Art

Currently two types of polymeric compositions are being used for the fabrication of fascia structures. In the one, disclosed in U.S. Pat. No. 3,915,928, the composition comprises an injection moldable mixture of a crystalline copolymer of ethylene and propylene or a terpolymer of ethylene, propylene and a non-conjugated diene; carbon, from 5 to 30 weight percent of chopped glass fibers and sulfur based vulcanizing agents. Parts injection molded from this composition show "trail" lines due to alignment of the glass fibers and the parts must be routinely sanded prior to painting in order to produce acceptable automotive fascia.

In the other, in which the end product is a microcellular polyurethane, described in a paper by Prepelka and Wharton, "Reaction Injection Molding in the Automotive Industry," Journal of Cellular Plastics, p. 87, March/April 1975, the cost of the components comprising the composition is higher than the cost of hydrocarbon based elastomers and production of the polyurethane structures requires specialized metering and mixing equipment and presses.

A variety of compositions and processes have been described in the patent literature for the post vulcanization of preformed elastomers.

U.S. Pat. No. 3,198,868 discloses a process for vulcanizing preshaped articles formed from vulcanizing materials comprising blends of amorphous copolymers of ethylene and higher α-olefins with polyethylene wherein the shaped article is impregnated with a solution of an organic peroxide, dried and vulcanized by the application of heat.

U.S. Pat. No. 3,256,366 discloses a process for the preparation and vulcanization of a mixture of a copolymer of ethylene and propylene containing 40 to 60 mol percent of ethylene (30.8 to 50.0 weight percent of ethylene) with either low density or high density polyethylene comprising: mixing the polymers at a temperature above 125° C.; adding a peroxide to the mixture at a temperature in the range of about 60° C. to about 90° C.; shaping the mixture to a conformation; and heating the shaped article to vulcanize it at a temperature in the range of about 150° C. to 180° C.

British Pat. No. 1,294,665 discloses cross-linked, electrically conductive, heat-shrinkable polymer compositions having volume resistivities below 1000 ohms-centimeter which comprise mixtures of: at least 40 parts of an electrically conductive filler; at least 20 parts of a natural or synthetic rubber; and at least 10 parts of a normally solid, heat-flowable homo- or copolymer of ethylene.

SUMMARY OF THE INVENTION

This invention is concerned with a method for the preparation and the thermoset, cross-linked product of a composition consisting essentially of (a) an elastomeric polymer selected from the group consisting of copolymers of ethylene and propylene containing 62 to 80 weight percent ethylene and possessing a crystalline content in the range of about 10 to about 25 weight percent, and terpolymers of ethylene, propylene and a $C_6$–$C_{10}$ non-conjugated diolefin containing from about 72 to about 80 weight percent of ethylene and possessing a crystalline content in the range of about 15 to about 25 weight percent;

(b) 50 to 150 parts per hundred parts by weight of elastomeric polymer, preferably 80 to 120 parts, of a low-density polyethylene having a melt index in the range of 2 to 40, preferably 12 to 20;

(c) 50 to 150 parts per hundred parts by weight of elastomeric polymer, preferably 80 to 120 parts, of a medium to high structure form of carbon, such as carbon black;

(d) 0.5 to 5 parts per hundred parts by weight of elastomeric polymer, preferably 1 to 3 parts, of one or more polyfunctional vinylic or allylic monomers; and (e) 1 to 10 parts per hundred parts by weight of elastomeric polymer, preferably 2 to 6 parts of an organic peroxide comprising one or more peroxide moieties in the molecule having the following structure:

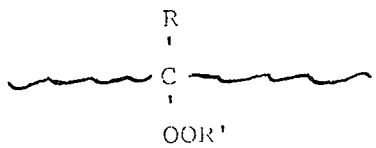

wherein R and R' are independently selected from the group consisting of $C_1$ to $C_8$ alkyl radicals and provided said peroxide has a half-life at 130° C. in excess of 5 hours and less than 1 minute at 230° C. when tested in low-density polyethylene.

The above composition, when compounded by the method of this invention as disclosed hereinbelow, possesses a rheology which permits the unvulcanized compound to flow through narrow orifices over relatively large distances at temperatures and under pressures that will not prematurely vulcanize the compound when large structures are fabricated by injection molding. The inclusion of carbon in an amount sufficient to give the vulcanized composition a volume resistivity in the range of $10^3$ to $10^8$ ohm-cm permits the vulcanized composition to be painted electrostatically. The presence of carbon black is considered essential for reinforcement purposes allowing the product to be removed from the hot mold without tearing.

The physical properties of the cross-linked composition makes the composition particularly useful in the automotive field for the fabrication of fascia, fender extensions and grilles.

DESCRIPTION OF PREFERRED EMBODIMENTS

A. Polymers

Copolymers of ethylene and propylene containing from about 62 to about 80 weight percent of ethylene, preferably 65 to 76 weight percent of ethylene and possessing a crystalline content in the range of about 10 to about 25 weight percent; and terpolymers of ethylene, propylene and a $C_6$ to $C_{10}$ non-conjugated diolefin containing from about 72 to about 80 weight percent of ethylene and a crystalline content in the range of about 15 to about 25 weight percent, having a range of molecular weights and Mooney viscosities suitable for the practice of this invention may be readily prepared using soluble Ziegler-Natta catalyst combinations well known in the art.

Suitable copolymers have a Mooney Viscosity, ML(1+8) at 127° C. in the range of about 10 to about 40, preferably 13 to 27.

Suitable terpolymers have from about 0.5 to 5 weight percent of a $C_6$ to $C_{10}$ non-conjugated diolefin, nonlimiting examples of which include: 5-ethylidene-2-norbornene, 1,4-hexadiene, and dicyclopentadiene. These terpolymers have Mooney viscosities, ML(1+8) at 127° C. in the range of 10 to 40.

Ethylene content of the polymers may be readily determined by the method of Gardner, Cozewith and VerStrate: Rubber Chem. & Tech. 44, 1015 (1971). Crystallinity of the polymers may be determined by the method of VerStrate & Wilchinsky: J. Polymer Sci. A-2, 9, 127 (1971).

Low-density polyethylene having a density of 0.93 g/cm³ or less and a melt index in the range of about 2 to about 40, preferably 12 to 20 is preferred for mixing with the polymers comprising ethylene and propylene.

All of the above polymers are produced commercially and are available in tonnage quantities.

B. Carbon Black

Carbon blacks suitable for the practice of this invention include medium to high structure blacks which not only add reinforcement to the cross-linked structure but when used in an amount equal to about 20 to 40 weight percent based on the total composition yield a cross-linked structure having adequate electrical conductivity for painting by electrostatic means.

The carbon blacks may be further defined as those having a nitrogen surface area of about 30 to 100 square meters per gram and a DBP absorption (ASTM D-2414) of about 60-125. Specific examples are the ASTM D-2516 grades of carbon black such as N-326, N-330, N-339, N-347, N-351, N-440, N-539, N-550, N-660, N-650, N-762 and N-765.

C. Polyfunctional Vinylic and Allylic Monomers

Polyfunctional vinyl and allylic monomers have been found to be a critical ingredient in the compositions of the present invention. The presence of these monomers in the composition is essential to provide curing of the composition so that the injection molded article prepared in accordance with the present invention passes the Heat Sag test which is an indication of the extent of crosslinking that has been achieved.

The monomers useful in the present invention are those polyfunctional vinylic and allylic monomers containing two or more polymerizable groups, at least one of which is a vinyl or allyl functional group.

Illustrations of such vinylic and allylic monomers useful in the present invention are polyfunctional monomers containing two or more vinyl groups such as divinylbenzene, trivinylbenzene, 2,3-divinylpyridine, divinyl sulfone and 2,5-divinyl-6-methylpyridine, polyfunctional acrylate monomers such as ethylene glycol dimethacrylate, trimethylol propane trimethacrylate, 1,2-propanediol dimethacrylate, polyfunctional allyl monomers such as diallyl cyanurate, triallyl cyanurate, diallyl maleate, diallyl phthalate.

Particularly preferred monomers for use in the present invention are ethylene glycol dimethacrylate, trimethylol propane trimethacrylate, divinylbenzene and triallyl cyanurate, with the latter being especially effective.

D. Peroxides

The choice of the peroxide is critical to both the physical properties and the paintability of structures molded from the composition. In order for a particular peroxide to be suitable for the practice of this invention it must not undergo appreciable decomposition with attendant free-radical formation at the temperature at which it is blended into the composition and at the temperature at which the composition is injection molded, but the decomposition end-products of the peroxide must be compatible with the crosslinked elastomeric structure. Preferably, the peroxide should decompose at the lowest possible temperature above the flux temperature of the compound.

Acceptable peroxides for use in the present invention are defined in terms of half-life at two temperature ranges. It has been determined in accordance with the present invention that the peroxide must have a half-life, when measured in low density polyethylene, which is greater than 5 hours at 130° C. and less than 1 minute at 230° C. An organic peroxide curing agent which exhibits this half-life will provide the proper balance of inhibition of curing during processing temperature and the desirable crosslinking promotion under injection molding conditions and produce articles which do not exhibit "bloom."

2,5-dimethyl-2,5-di(t-butyl peroxy)hexane:

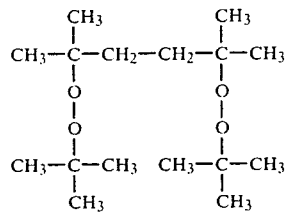

meets the half-life requirements noted hereinabove, has the required stability at blending temperatures and effects a cure of the molded structure at a temperature and time which is acceptable under current production schedules and can produce bloom-free articles and therefore represents a preferred peroxide curing agent. Its precise half-life measurements are reported in Table I.

It has been common practice to rate peroxides in terms of half-life time (50% decomposition) at a particular temperature. Nearly all of the data reported in the literature have been based on determinations made in solution in benzene with results which differ materially when the data are obtained for example for the case where the peroxide has been blended with a thermoplastic such as low-density polyethylene (LDPE).

Table I gives the results obtained with "Luperco 101-XL," a commercial grade of 2,5-dimethyl-2,5-di(t-butyl peroxy) hexane containing 45% active ingredient, the 55% inactive portion being an inert silica support, when tested in benzene and LDPE.

TABLE I

| HALF-LIFE TIME TEMPERATURE OF LUPERCO 101-XL | | |
|---|---|---|
| | Temperature for 50% Decomposition | |
| Medium | 1 Minute | 10 Hours |
| In Benzene, °C. | 175° | 119° |
| In LDPE, °C. | 192° | 131° |

Peroxides such as ter-butyl peroxypivalate, dicumyl peroxide and 2,4-dichlorobenzoyl peroxide have been evaluated but have been found not to have the requisite curing characteristics to produce products in accordance with the present invention.

E. Process

In accordance with the present invention, the process for producing an injection molded composition, which, when crosslinked, meets the requirements for automotive fascia, namely: process rheology, physical properties and amenability to electrostatic painting comprises: (a) mixing the copolymer or terpolymer interpolymer comprising ethylene and propylene with the low-density polyethylene and carbon in an internal mixer, such as a Banbury mixer at a temperature above the crystalline melting point of the polyethylene; (b) cooling the mixture to a temperature below 130° C.; (c) adding the peroxide and the polyfunctional vinylic or allylic co-curing agent and thoroughly mixing and fluxing the composition while maintaining the temperature below about 130° C., the composition being flowable below 130° C.; (d) introducing the mixed and fluxed composition into the mold of an injection molding machine; (e) curing said composition to the crosslinked, thermoset state in the mold of said injection molding machine at a temperature of about 175° C. to about 230° C. for about 1 minute to about 10 minutes; and (f) obtaining from said mold a cured thermoset composition having a flexural modulus of about 20,000 to 30,000 psi at room temperature.

A further embodiment of the present invention are the thermoset products prepared in accordance with the foregoing process.

F. Properties

Compositions suitable for the production of automotive fascia by injection molding techniques must possess a rheology which will permit the fabrication of structures which may be as large as 170 cm by 80 cm by 1 cm. When attempts are made to injection mold elastomers, very high pressures must be used, as contrasted to thermoplastics, since as a general rule elastomers have a much higher viscosity than thermoplastics at the same temperature. The difficulties in the use of elastomers for the production of fascia are made more severe since fascia structures are required to have high flexural modulus. To achieve high flexural modulus with most elastomers usually requires that the elastomers be compounded with large amounts of reinforcing fillers. The addition of fillers increases the viscosity of the compounded elastomer so that the use of injection molding for fabrication requires impractically high injection pressures. Use of fillers which do not appreciably increase the viscosity of the compounded stock, yields structures which do not meet the required physical properties. Attempts to obtain the necessary stiffness by the incorporation of a substantial quantity of glass fiber has not been too satisfactory since the molded parts usually show the flow pattern of the glass fiber on its surface and the part requires extensive sanding and buffing before painting. Also, glass fibers can adversely affect the mold itself by causing abrasion of the mold surface.

A major object of this invention is the production of an elastomeric composition, and a process for its preparation, which possesses a rheology suitable for the fabrication of automotive fascia by injection molding and after crosslinking has a flexural modulus in the range of about 20,000 to 30,000 psi at room temperature and a conductivity suitable for painting by electrostatic means.

We have now found that homogeneous blends of elastomeric polymers comprising ethylene and propylene; low-density polyethylene, carbon black, a multifunctional vinylic or allylic monomer; and a peroxide possess a viscosity which permits the compound to be injection molded through small orifices into a mold cavity at reasonable temperatures and pressures, and when crosslinked by the application of heat yields smooth structures requiring no prefinishing before painting, possesses adequate flexural strength and is readily painted by electrostatic means.

The choice of the olefinic homopolymer thermoplastic that is blended with the ethylene-propylene copolymer or terpolymer is critical. The homopolymer must be compatible with the elastomer while at the same time flux at a temperature below about 130° C. which is the maximum safe processing temperature that can be maintained in the barrel of the injection molding machine. Both high density polyethylene and polypropylene are not suitable since both require higher processing temperatures which could cause serious scorching problems in the barrel. When scorching occurs, the compound undergoes a significant increase in viscosity and loses its ability to flow through the mold. In addition, polypropylene, unlike low-density polyethylene, undergoes chain scission in the presence of peroxides, rather than forming crosslinks. Other non-olefinic thermoplastics do not have sufficient compatibility with EPM or EPDM elastomers and are therefore not suitable for blending.

While the physical properties desired in automotive fascia have not been finalized by the manufacturers, the best estimate of the property requirements from published information is as follows:

TABLE II

| PHYSICAL PROPERTIES OF AUTOMOTIVE FASCIA | |
|---|---|
| Property | Requirement |
| Tensile at Failure, psi (ASTM D-638) | 1,500 Minimum |
| Ultimate Elongation, % (ASTM D-638) | 150 Minimum |
| Tear Strength, ppi (ASTM D-624) | 300 Minimum |
| Flexural Modulus, psi (ASTM D-790) | |
| at −28° C. | 100,000 Maximum |
| at 23° C. | 20–30,000 |
| at 70° C. | 7,000 Minimum |
| Flexural Set, Chevrolet CTZ-ZZOO3[a] Degree after 5 minutes | 15 Maximum |
| Heat Sag, Chevrolet CTZ-ZZOO6[b] Cm at 121° C. | 4 Maximum |

Notes:
[a]The Chevrolet Flexural Recovery of Elastomeric Materials Test CTZ-ZZOO3 measures the ability of an elastomeric material to recover after being bent 180 degrees around a 0.50" mandrel at room temperature. Good recovery of fascia structures after impact is essential. An injection molded sample measuring 5" × ½" × ⅛" is bent 180 degrees and the angle of recovery measured after 5 minutes. A specimen that returns to its original position has a flexural set of 0 degrees, while a specimen that recovers only half-way has a flexural set of 90 degrees.
[b]The Chevrolet High Temperature Sag of Elastomeric Materials Test measures the sag of an injection molded specimen measuring 6" × 1" × ⅛" clamped with a 4 inch overhang and heated at a specified temperature in a circulating hot-air oven for 1 hour.

This invention will be further understood by reference to the following examples which include but are non-limiting to preferred embodiments of the instant invention. Parts reported are by weight.

EXAMPLE 1

Fifty parts of an ethylene-propylene and copolymer which comprised 65 percent by weight of ethylene, had a crystalline content of 11.5 weight percent, a $\overline{M}n$ of 35,000 and a Mooney Viscosity, ML (1+8) of 27° at 127° C. was masterbatched in a Banbury mixer at 180° C. for 5 minutes with 50 parts of a low-density polyethylene having a melt index of 21 and 50 parts of a general purpose furnace black N-660 and 0.2 parts of zinc stearate as a lubricant. The mixture was cooled and fluxed at a temperature of about 100° C. with 5 parts of a 45 percent active 2,5-dimethyl-2,5-di(t-butyl peroxy) hexane and 2 parts of a 75 percent active triallyl cyanurate.

Using the above compound, test specimens were injection molded in an injection molding machine equipped with a reciprocating screw, a 5 ounce capacity and a 100 ton clamp. Conditions during molding were as follows:

| Cylinder Temperature: | |
|---|---|
| Rear | 90° C. |
| Center | 100° C. |
| Front | 110° C. |
| Nozzle Temperature | 110° C. |
| Mold Temperature | 205° C. |

The injection molded specimens were retained in the mold for 105 seconds following the termination of the injection in order to effect crosslinking or vulcanization. The physical properties of the vulcanized compound were as follows:

TABLE III

| PROPERTIES OF VULCANIZED COMPOSITION | |
|---|---|
| Shore D Hardness | |
| Initial | 49 |
| 15 Seconds Reading | 43 |
| Tensile Strength, psi | 2,630 |
| Ultimate Elongation, % | 230 |
| Tear Strength, Die C, ppi | 410 |
| 5 Minutes Flexural Set, Degrees | 12 |
| Droop at 121° C. cm | 3.5 |
| Secant Flexural Modulus, psi | 20,000 |

EXAMPLE 2

The procedure of Example 1 was repeated except that the 50 parts of the EPM copolymer was replaced with 55 parts of an EPM copolymer containing 76 weight percent of ethylene having a Mooney Viscosity ML (1+8) of 13 at 127° C. The physical properties of the molded composition after curing for 5 minutes at 180° C. were as follows:

TABLE IV

| PROPERTIES OF VULCANIZED COMPOUND | |
|---|---|
| Shore D Hardness | |
| Initial | 48 |
| 15 Seconds Reading | 42 |
| Tensile Strength, psi | 3,000 |
| Ultimate Elongation, % | 280 |
| Tear Strength, Die C, ppi | 400 |
| 5 Minutes Flexural Set, Degrees | 14 |
| Droop at 121° C. cm | 3.5 |
| Secant Flexural Modulus, psi | |
| at −29° C. | 100,000 |
| at 23° C. | 28,000 |
| at 70° C. | 8,000 |

EXAMPLE 3

The procedure of Example 1 was repeated with a composition which had the following proportions in parts by weight:

| EPM[a] | 80 |
|---|---|
| Low Density PE (Melt Index-21) | 50 |
| N-660 Carbon Black | 60 |
| Zinc Stearate | 0.2 |
| Triallyl Cyanurate (TAC) 75% Active | 2 |
| Luperco 101-XL Peroxide (45% Active) | 6.5 |

[a]Ethylene-propylene copolymer, 76 wt. % ethylene.

Mooney Viscosity, ML (1+8) of 13 at 127° C. Physical properties of test specimens molded from the above composition and cured for 5 minutes at 180° C. were as follows:

TABLE V

| PROPERTIES OF VULCANIZED COMPOUND | |
|---|---|
| Shore D Hardness | |
| Initial | 47 |
| 15 Seconds Reading | 42 |

TABLE V-continued

| PROPERTIES OF VULCANIZED COMPOUND | |
|---|---|
| Tensile Strength, psi | 3,100 |
| Ultimate Elongation, % | 310 |
| Tear Strength, Die C, ppi | 420 |
| 5 Minutes Flexural Set, Degrees | 12 |
| Droop at 121° C. cm | 3.0 |
| Secant Flexural Modulus, psi | |
| at −29° C. | 100,000 |
| at 23° C. | 27,000 |
| at 70° C. | 7,000 |

EXAMPLE 4

Example 3 was repeated with the same polymers but with the following proportions:

| EPM | 50 |
|---|---|
| Low Density PE | 50 |
| N-660 | 40 |
| Zinc Stearate | 0.2 |
| TAC (75%) | 2.0 |
| Luperco 101-XL (45%) | 5.0 |

Physical properties after molding and curing for 5 minutes at 5 minutes at 180° C. were as follows:

TABLE VI

| PROPERTIES OF VULCANIZED COMPOSITION | |
|---|---|
| Shore D Hardness | |
| Initial | 49 |
| 15 Seconds Reading | 43 |
| Tensile Strength, psi | 3,000 |
| Ultimate Elongation | 310 |
| Tear Strength, Die C, ppi | 400 |
| 5 Minutes Flexural Set, Degrees | 13 |
| Droop at 121° C. cm | 4.0 |
| Secant Flexural Modulus, psi | |
| at −29° C. | 100,000 |
| at 23° C. | 25,000 |
| at 70° C. | 7,000 |

All of the test specimens molded from the above compositions had smooth surfaces free from bloom and had conductivities in the range of $10^3$ to $10^8$ ohm-cm. The results also show that the compositions meet the current criteria for automotive fascia.

What is claimed is:

1. A process for preparing an injection-molded thermoset composition which comprises:
    (a) mixing an interpolymer comprising ethylene and propylene, said interpolymer having an ethylene content in the range of about 62 to about 80 weight percent of ethylene and a crystalline content in the range of about 10 to 25 weight percent with from 50 to 150 parts by weight, per hundred parts by weight of interpolymer, of a low density polyethylene having a melt index in the range of 2 to 40 and 50 to 150 parts by weight, per hundred parts by weight of interpolymer, of a reinforcing carbon black having a nitrogen surface area of about 30 to 100 M²/gram at a temperature above the crystalline melting temperature of the polyethylene thereby preparing a first mixture;
    (b) cooling said first mixture to a temperature below 130° C.;
    (c) adding to said first mixture from 0.5 to 5 parts by weight, per hundred parts by weight of interpolymer, of one or more polyfunctional vinylic or allylic monomer and from 1 to 10 parts by weight, per hundred parts by weight of interpolymer, of an organic peroxide comprising one or more peroxide moieties in the molecule having the following structure:

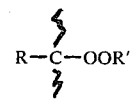

wherein R and R' are independently selected from the group consisting of $C_1$ to $C_8$ alkyl radicals said peroxide having a half-life when measured in low density polyethylene in excess of 5 hours at 130° C. and less than 1 minute at 230° C.;
    (d) admixing and fluxing said first mixture and said additives to a composition while maintaining the temperature below 130° C. the composition being flowable below 130° C.;
    (e) introducing the mixed and fluxed composition into the mold of an injection molding machine;
    (f) curing said composition to the crosslinked, thermoset state in the mold of said injection molding machine at a temperature of about 175° C. to about 230° C. for about 1 minute to about 10 minutes; and
    (g) obtaining from said mold a thermoset composition having a flexural modulus of about 20,000 to about 30,000 psi at room temperature.

2. A process according to claim 1 wherein said interpolymer is a copolymer of ethylene and propylene having an ethylene content in the range of about 65 ;o 76 weight percent, a crystalline content in the range of about 10 to 25 weight percent and a Mooney Viscosity ML(1+8) at 127° C. in the range of about 13 to 27.

3. A process according to claim 1 wherein said interpolymer is a copolymer of ethylene and propylene having an ethylene content in the range of about 65 to 71 weight percent, a crystalline content in the range of about 10 to 25 weight percent and a Mooney Viscosity ML(1+8) at 127° C. in the range of about 10 to 40.

4. A process according to claim 1 wherein said interpolymer is a terpolymer of ethylene, propylene and a non-conjugated diene selected from the group consisting of 1,4-hexadiene, 5-ethylidene-2-norbornene and dicyclopentadiene, said interpolymer having an ethylene content in the range of about 72 to about 80 weight percent and a Mooney Viscosity ML(1+8) at 127° C. in the range of about 10 to 40.

5. A process according to claim 1 wherein the polyfunctional monomer is triallyl cyanurate.

6. A process according to claim 1 wherein said polyfunctional monomer is selected from the group consisting of ethylene glycol dimethacrylate, trimethylolpropane trimethacrylate, and divinylbenzene.

7. A process according to claim 1 wherein said peroxide is 2,5-dimethyl-2,5-di(t-butyl peroxy) hexane.

8. The product produced by the process of claim 1.
9. The product produced by the process of claim 2.
10. The product produced by the process of claim 3.
11. The product produced by the process of claim 4.
12. The product produced by the process of claim 5.
13. The product produced by the process of claim 6.
14. The product produced by the process of claim 7.